United States Patent
Stacey

[15] 3,637,985
[45] Jan. 25, 1972

[54] PORTABLE REMOTE LOCATION MEASURING SYSTEM

[72] Inventor: David S. Stacey, Carbondale, Colo.
[73] Assignee: Ball Corporation, Muncie, Ind.
[22] Filed: Jan. 21, 1969
[21] Appl. No.: 792,395

[52] U.S. Cl. ..........................................................219/490
[51] Int. Cl. ......................................................H05b 1/02
[58] Field of Search ......................219/210, 490, 501, 401; 73/359, 341, 362; 340/208, 224; 307/117; 325/113, 67; 220/17; 165/75

[56] References Cited

UNITED STATES PATENTS

| | | | |
|---|---|---|---|
| 1,323,525 | 12/1919 | Dutton | 219/401 X |
| 1,958,590 | 5/1934 | Peirce | 219/401 |
| 2,635,468 | 4/1953 | Field et al. | 73/341 X |
| 2,818,732 | 1/1958 | Bennett | 73/362 |
| 2,992,120 | 7/1961 | Elsken | 340/208 X |
| 3,008,666 | 11/1961 | Kuck | 325/113 X |
| 3,158,027 | 11/1964 | Kibler | 340/224 X |
| 3,298,430 | 1/1967 | Kodaira | 219/388 X |
| 3,333,476 | 8/1967 | Hardy et al. | 73/362 R |

Primary Examiner—Bernard A. Gilheany
Assistant Examiner—F. E. Bell
Attorney—Campbell, Harris and O'Rourke

[57] ABSTRACT

A portable system for measuring a condition, particularly temperature, and indicating this measurement at a remote location. A portable insulating and protective container adapted for use in extreme temperature environments, such as occasioned within a furnace or oven, houses a small transmitter. The transmitter is connected to a transducer responsive to the condition to produce a signal that is transmitted to a remote receiving and monitoring location.

9 Claims, 8 Drawing Figures

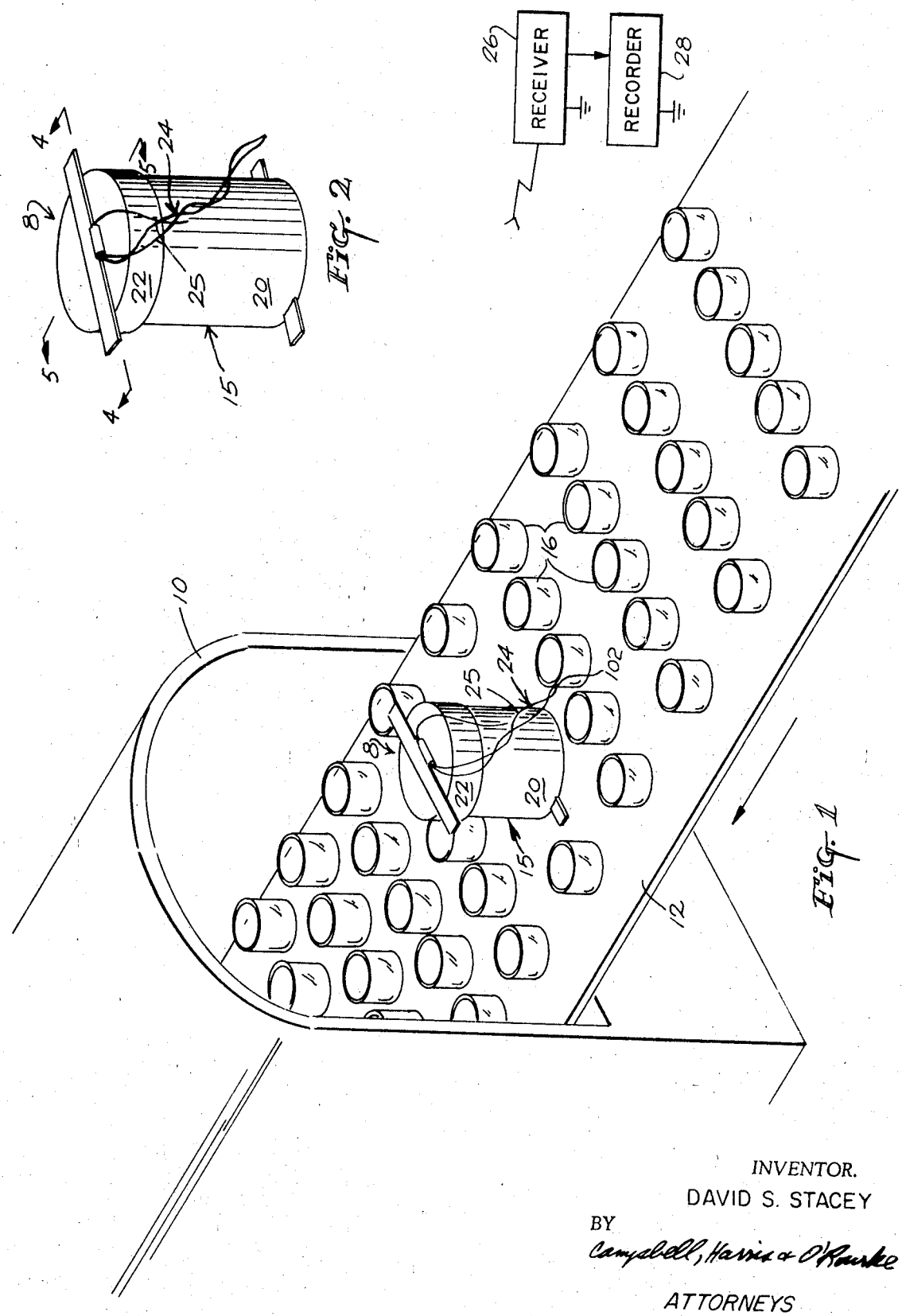

INVENTOR.
DAVID S. STACEY

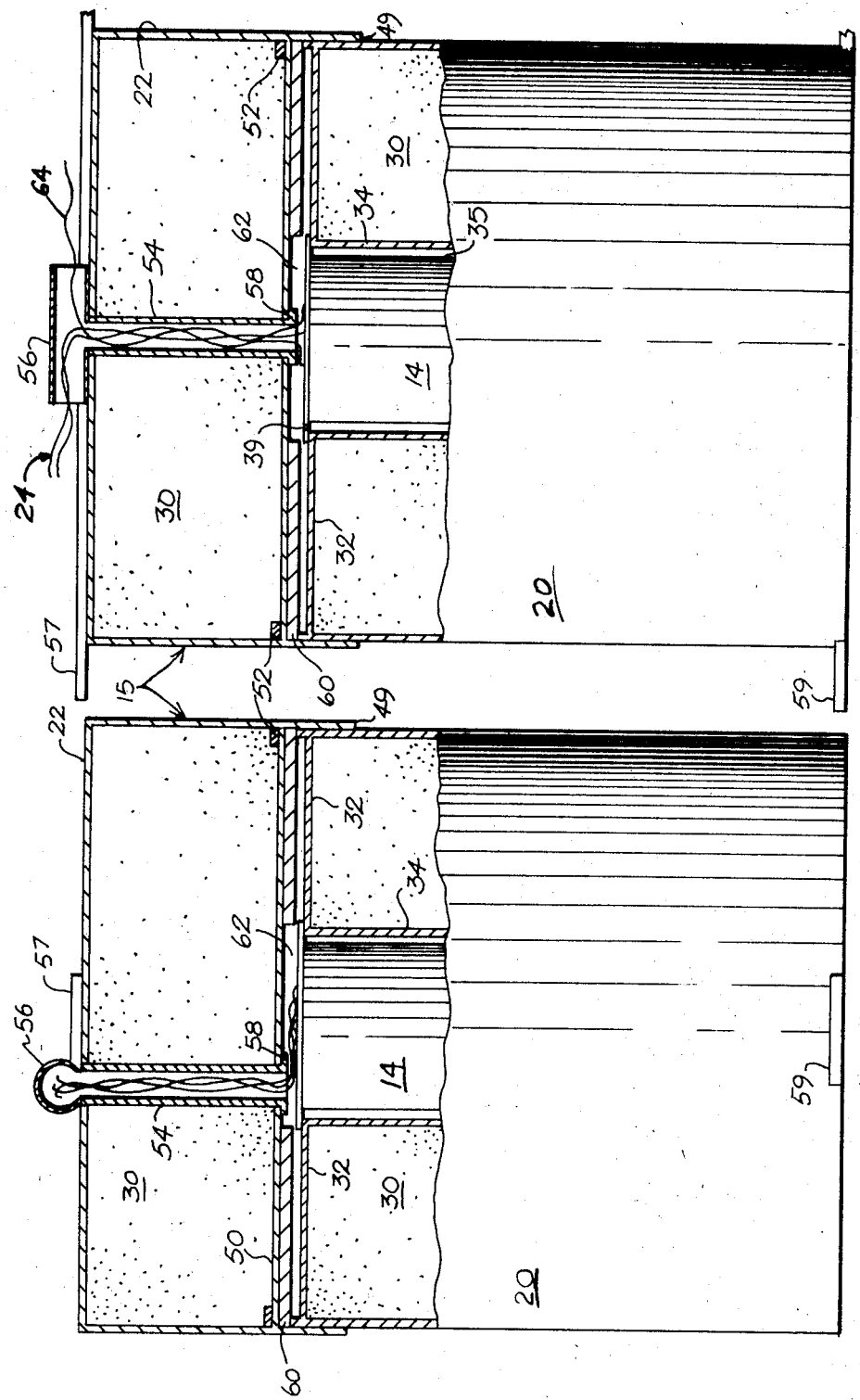

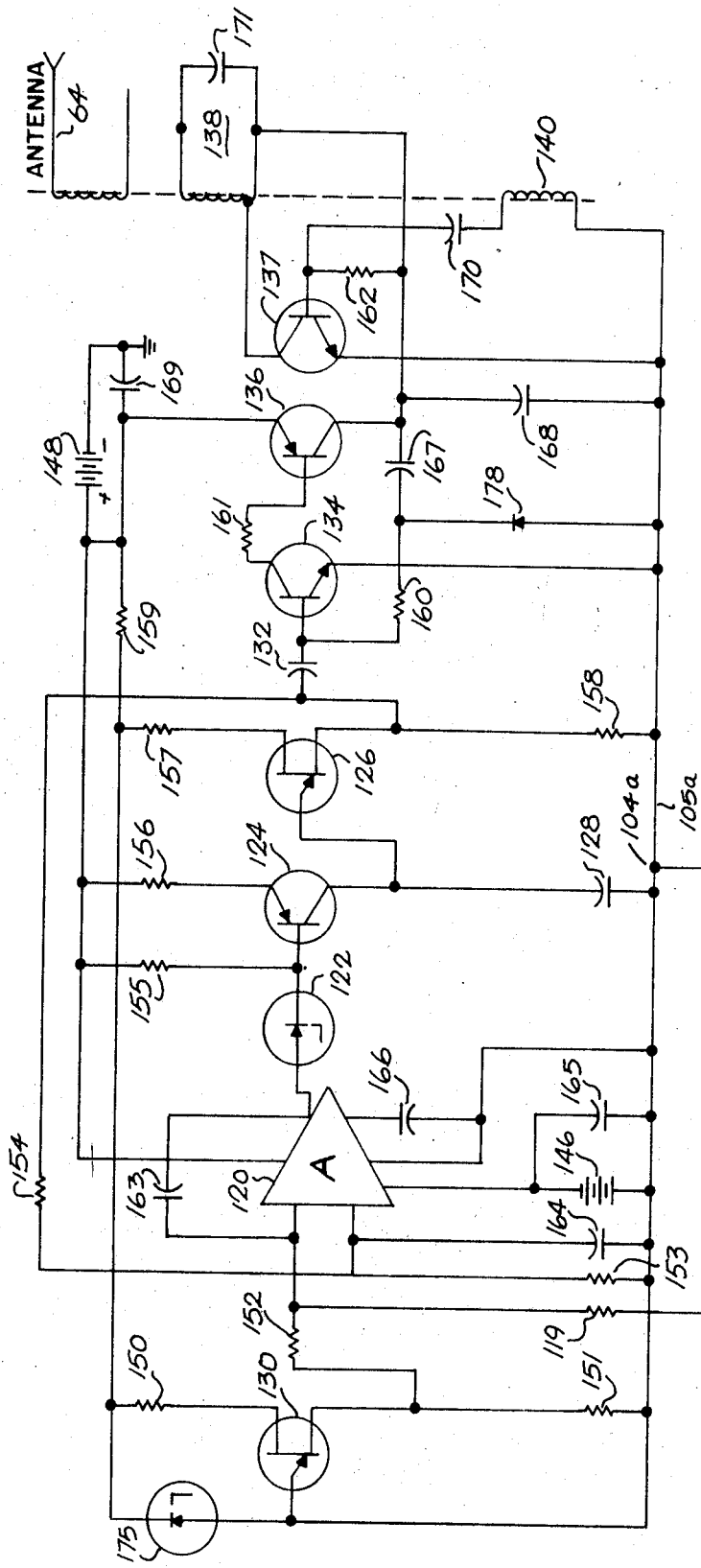
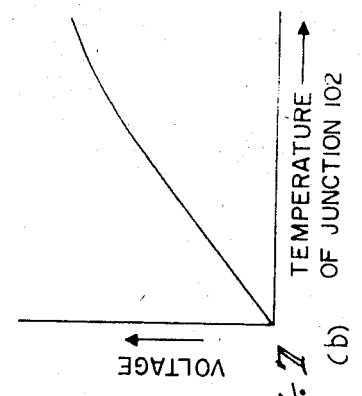
Fig. 7 (b)
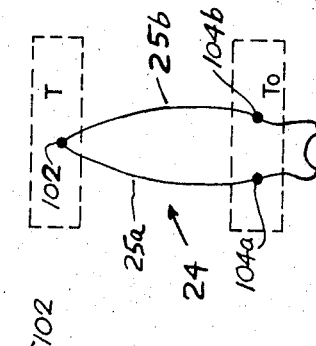
Fig. 6 (a)
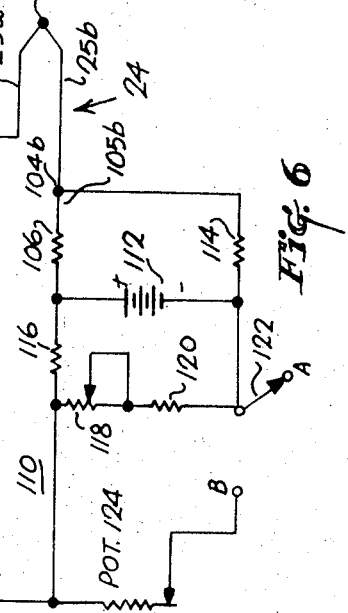
INVENTOR.
DAVID S. STACEY
BY
Campbell, Harris + O'Rourke
ATTORNEYS

PORTABLE REMOTE LOCATION MEASURING SYSTEM

BACKGROUND OF THE INVENTION

1. Field of the Invention

This invention relates to a remotely located condition measuring system and particularly to a portable system for use in an oven to generate temperature indicative signals and to transmit these signals.

2. Description of the Prior Art

It is often necessary to determine the existence and magnitude of a condition at a remote location. This is particularly true, for example, in the maintenance of temperature conditions in glass production wherein glassware, such as containers, tubing, or glass sheets and the like, is formed at relatively high temperatures and is thereafter annealed or heat-treated down to room temperatures.

It is well recognized that the range of temperatures for optimum annealing of glassware is relatively small and, as annealing time is decreased in the interest of manufacturing efficiency without sacrificing favorable physical and chemical properties of the glass product, temperature regulation becomes even more critical. Often, the temperature of glassware within the oven, known as a lehr, must be controlled within a tolerance of plus or minus 50° F. in order to achieve optimum annealing; hence, it is important that the glassware temperature be closely monitored as the ware travels through the annealing lehr or oven. In this manner, better regulation of the temperature in the oven can be achieved which results, of course, in better regulation of glassware temperatures.

While apparatus for temperature measurement within an oven or furnace, including optical or radiation pyrometers, electronic pyrometers and thermocouples, have heretofore been known and/or utilized, none of these devices have proved to be completely successful. A major problem with the optical pyrometer, which measures the intensity of radiation by an incandescent body, is that the hot gases contained in the medium about the body interfere with the readings. As is well known, temperature responsive electronic devices, such as thermistors, are not practical at the high temperatures encountered in the first stages of a glass-annealing process.

While the thermocouple overcomes many of the disadvantages of other prior art devices, it has not proved to be completely successful due at least partially to bulkiness and a requirement for associated usage of unwieldly equipment, particularly where long oven usage was contemplated. More specifically, if the thermocouple is to travel with the ware riding on a belt through the annealing oven, wire conductors have heretofore been necessary in order to conduct the electrical signal from the thermocouple to a temperature meter or recorder outside the oven for prompt indication. Beside being cumbersome, the added effective resistance of the wires subjected to varying oven temperatures tended to introduce errors which often made the obtained readings so inaccurate as to be unreliable.

The present invention is an improvement over such temperature measurement systems of the prior art; yet, the invention permits the use of a relatively inexpensive sensor such as a calibrated thermocouple for the measurement. The apparatus includes a portable transmitting unit which is impervious to contemplated adverse conditions to be encountered; also, the unit is small enough to travel through an annealing oven with the ware and requires no associated cumbersome equipment or connecting wires to generate a condition indicating signal and conduct the same outside the oven for utilization.

The portable unit includes a transmitter responsive to the magnitude of the signal from a transducer, such as a thermocouple utilized in the measurement of temperature, to radiate signals suitable for immediate conversion outside of the oven to a temperature indicator that accurately reflects the temperature sensed within the oven. The unit further includes, in order to protect the electrical components of the transmitter, an insulating container adapted to receive the transmitter for protecting it against high temperatures encountered within the oven.

SUMMARY OF THE INVENTION

The invention enables accurate and remote monitoring of a condition. It is particularly useful for measurement of extreme temperature conditions such as may be encountered in a glass-annealing oven. Further, the invention enables accurate temperature measurement in changing environments which are displaced one from the other and from the monitoring location.

Thus, it is an object of the present invention to provide a novel portable sensing system for the indication of a condition existing at a remote location from the condition monitoring location.

It is another object of the invention to provide a wireless sensing system for the measurement of a condition and the indication of the condition at a remote location.

It is a further object of the invention to provide a portable measuring apparatus which may be operated in a high temperature environment such as occasioned within an oven or furnace.

A further object of the invention is to provide a transmitting unit operative within a high temperature environment to produce and transmit signals indicative of a condition such as temperature within the environment.

A further object of the present invention is to provide a portable temperature sensing system having a calibrated thermocouple transducer responsive to temperature, and a temperature compensation network to automatically produce a signal to compensate for the change in the reference junction temperature of the thermocouple from the reference junction calibration temperature thereof.

Another object of the invention is to provide an insulating container for housing and protecting a transmitter from extreme environmental conditions outside the container.

It is a further object of the invention to provide a portable temperature sensing system having the contained transmitter sensing system having the contained transmitter responsive to a transducer signal, and an adjustable temperature compensation network to provide a signal to compensate for parameter changes of the transmitter due to temperature changes thereof from a predetermined reference temperature.

These and other objects and advantages will be apparent to those skilled in the art from the following description of a preferred embodiment of the invention as shown in the accompanying drawings.

BRIEF DESCRIPTION OF THE DRAWINGS

FIG. 1 is a perspective view of the measuring apparatus of the invention shown in conjunction with an annealing lehr to sense temperatures within said lehr;

FIG. 2 is a perspective view of the portable measuring apparatus shown in FIG. 1;

FIG. 4 is a side sectional view of the container taken along the lines 4—4 of FIG. 2;

FIG. 5 is a view similar to FIG. 4 but taken along the lines 5—5 of FIG. 2;

FIG. 6 is a schematic circuit diagram of the transmitter shown in FIG. 3; and

FIGS. 7a and 7b are a circuit and graph, respectively, to illustrate the manner of calibration of the thermocouple.

DESCRIPTION OF THE PREFERRED EMBODIMENT

Figure 3:
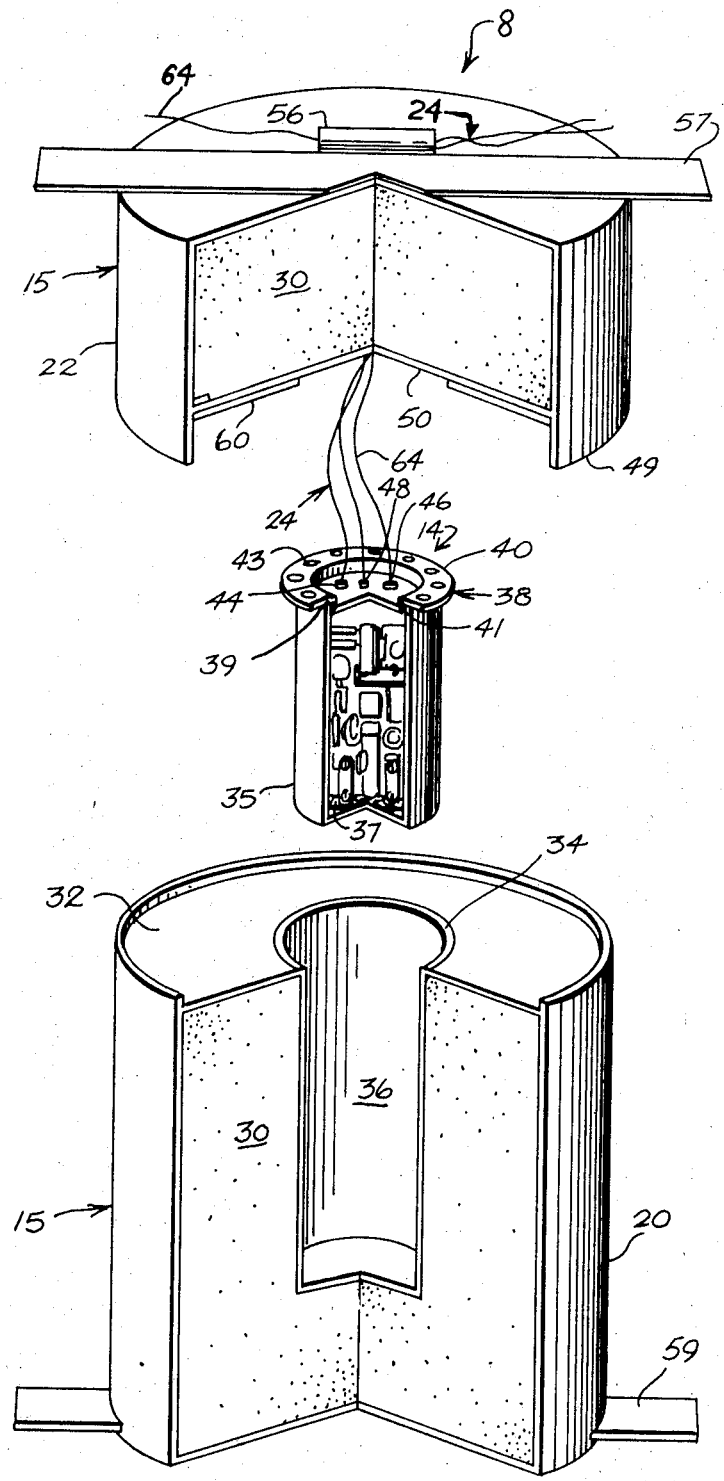
FIG. 3 is an exploded perspective view of the transmitting unit with a portion cutaway for illustrative purposes.

Referring to FIG. 1, a preferred embodiment of the measurement apparatus 8 of the system for use in a high-temperature environment is shown positioned to travel through an oven or furnace 10 on a conveyor belt 12 in the direction as indicated by the arrow. Measuring apparatus 8 includes a transmitting unit 14 (as shown in FIG. 3) positioned within an insulating container 15 of a material such as steel, for example, and is provided to generate a signal indicative of temperature, such as the temperature of one of the glass jars 16. Measuring apparatus 8 and jars 16 are positioned on the conveyor belt 12 so as to permit travel through the oven at a fixed distance one from the other. Measurement apparatus 8 includes, as shown best in FIGS. 2 and 3, the insulating container 15 having a base member shown in the drawings as a metal cylindrical can 20 and a metal cover member 22 also cylindrical in shape and adapted to tightly fit onto the can 20.

A thermocouple 24 is attached to the surface of a jar 16 by any conventional means such as by a tape or by a suitable temperature-resistant bonding adhesive. The temperature of the particular jar 16 is sensed by the thermocouple 24 and the corresponding signal conducted through wires 25 to the transmitting unit 14. The temperature signal is thereupon processed as more fully hereinafter described with reference to FIG. 6 and a corresponding radiant energy signal is transmitted out of the oven 10 to a receiver 26, preferably located outside the oven, the output signal from which receiver may be immediately indicated by a temperature meter (not shown) and/or permanently recorded on a time-temperature recorder 28.

Although a thermocouple for producing a signal corresponding to temperature is shown, it should be readily apparent that other transducers might be substituted to detect other conditions; for example, a stain gage to detect thermal expansion or contraction of an article such as one of the jars 16. In addition, it is to be appreciated that the transmitted signal could be an environmental signal within the oven in which case the transducer may be detached from any article traveling through an oven 10.

Referring particularly to FIG. 3, there is shown a disassembled cutaway portion of the measurement apparatus 8. The can 20 is partially filled with an insulating powder 30 up to a refractory ring-shaped plate 32 and about a cylindrical cup 34 concentrically positioned within can 20 and held in place by the plate 32 and generally by the powder 30. Transmitter 14 is received and confined within a cavity 36 defined by the cup 34. The electrical elements of the transmitter are received in a casing, or can, 35 and are mounted on a rectangular circuit block 37 attached at one end to a base 38. In an embodiment constructed in accordance with the invention, can 35 and base 38 were also made of steel. Base 38 is essentially disc-shaped with a central portion closing the interior of the can 35 and having a shoulder 39 terminating in peripheral flange 40. Shoulder 39 extends downwardly from flange 40 and has an O-ring 41 mounted thereon to seal the can 35. Flange 40, which has a plurality of holes 41 when transmitter 14 is received within the cavity 36 so as to longitudinally position the transmitter within the cup 34.

The cylindrical casing, or can, 35 has a diameter smaller than the inner diameter of the cup 34 so as to define a space between respective walls thereof when the transmitter 14 is positioned within cavity 36, which space opens to holes 43 in flange 40. The central portion of base 38 has three openings therein to receive insulated terminals 44 and 46, and a ground terminal 48, which terminals are connected with the electrical components within the casing 35 as more fully hereinafter described with reference to FIG. 6.

Referring to FIGS. 3, 4, and 5, the cover member 22 has an outer cylindrical wall 49 slightly larger in diameter than can 20 so that the lower portion of wall 49 receives the upper portion of the can 20 therebetween. Cover member 22 is also filled with the insulating powder 30 but is contained by a refractory ring-shaped plate 50 positioned inwardly from the lower end and having a shoulder 52 at the inner wall of the cover member. Cover member 22 is provided with a longitudinally extending tube 54 opening at one end to a laterally extending chimney hood 56 suitably welded to the top of the cover member 22, and opening at the other end through plate 50 to the interior of can 20. A nut 58 is threadably engaged on the end of tube 54 adjacent to plate 50 to support the plate. As shown in FIG. 5, the passageway formed by the tube 54 extending through the cover 22 is offset from center; nevertheless, it should be apparent that exact positioning of the tube is not critical so long as tube 54 communicates with cup 34. Removal of the cover 22 from can 20 is facilitated by bars, or handles, 57 and 59 attached to the cover and can, respectively.

A ring 60 of a size sufficient to substantially bridge the area between the sidewall of can 20 and cup 34 is bonded to the plate 50 in order to facilitate positioning of cover 22. Thus, when the cover is in position on can 20, a cavity 62 is formed providing a passageway between tube 54 and the holes 43 in flange 40 and the passageway through tube 54. Since the cylindrical casing 35 of transmitter 14 has a diameter smaller than the diameter of the cup 34, a liquid may be contained within the cup 34 about and under the casing 35. Therefore, a liquid heated to its boiling point in the oven or furnace environment may escape in vapor form through holes 43 into the cavity 62 and through the passageway formed by tube 54 and out to the oven or furnace. The vapor or steam may also circulate in the cavity 62 between the ring 60 and plate 32.

The provision for the containment of a liquid, such as water, about the casing 35 insures that when heat is conducted through the thick layer of insulating powder 30 the casing 35 will reach at a maximum temperature only the boiling point temperature of the liquid contained. Of course, after the liquid is depleted, the casing 35 could reach a higher temperature and, hence, if the transmitter utilized cannot tolerate elevated temperature, then a sufficient supply of liquid must be assured for the operation time contemplated. If the transmitter can withstand elevated temperatures, then, of course, it is not mandatory that a liquid be used, although it might prove advantageous for more uniform results even in this latter case.

It is obvious that the general dimensions of the measurement apparatus 8, and more specifically the thickness of the layer of powder 30, and width of cup 34 may be varied depending on contemplated usage to maintain suitable transmitter temperature. The embodiment shown was built and tested for use at temperatures exceeding 1,000° F. for at least 15 minutes, and found to be satisfactory for use in conjunction with a glass annealing process.

The wires 25 of the thermocouples 24 attached to one of the glass jars 16 may be inserted through chimney hood 56, through tube 54, and connected to the insulated input terminal 44 and ground terminal 48 of the transmitter. Further, an antenna 64 from the transmitter 14 may be connected to the terminal 46 and also extend in the assembled position of the measurement apparatus 8 through the tube 54 and out of the cover member 22. Since the wave propagation distance out of the annealing oven 10 from the apparatus 8 is generally relatively short, suitable transmission may be effected, for example, by positioning a simple wire antenna outside the cover member 22.

Referring to FIG. 6, transmitter 14 receives a direct current input signal from thermocouple 24 through wires 25 which signal is indicative of the magnitude of the temperature at the surface of the particular glass jar 16 to which the thermocouple is secured. The thermocouple 24 is of a conventional type, such as iron-constantan, suitable for use over wide temperature ranges.

The thermocouple 24 is attached to the surface of the glassware, or jar, 16 at a measuring junction 102. Conductor 25a of one type metal, such as iron, is connected to a reference, or cold, junction 104a; and conductor 25b of another type metal, such as constantan, is connected to a reference, or cold, junction 104b. The junctions 104a and 104b may represent the connections of thermocouple 24 to transmitter 14 at the input and ground terminals 44 and 48, respectively, and which connections are made within can 20 with conductors 105a and 105b. Preferably, the metal conductors 105 of the circuit are copper. Therefore, a thermoelectric effect may also be developed across each junction 104 although the junctions are at substantially the same temperature.

The thermocouple having effectively three junctions may be calibrated in conventional manner as more particularly illustrated with reference to FIG. 7. FIG. 7a illustrates that the thermocouple 24 may be calibrated with the reference junctions 104 at a constant temperature ($T_0$), which is normally 32° F., the melting point of ice, to produce a voltage (V) measured by a meter 107 as a function of the temperature (T) of the measuring junction 102. A curve illustrating this relation may be drawn and is shown in FIG. 7b. It is well known that if the reference junctions of a three-junction thermocouple are maintained equal to each other but above the temperature at which the reference junctions are maintained during calibration (the new temperature being indicated by $T_1$), the indicated reading upon measurement is reduced and must be corrected. The correction is simply the voltage produced when the reference junctions are at temperature $T_0$ and the measuring junction at temperature $T_1$. The thermocouple relation may be expressed as follows:

$$^ET_0 \rightarrow T = {}^ET_0 \rightarrow T_1 + {}^ET_1 \rightarrow T \qquad (1)$$

where as already explained, $T_0$ is the reference junction calibration temperature, $T_1$ is a new reference junction temperature, and T is the measuring junction temperature.

In the present invention there is accordingly provided a sensistor 106 of conventional type and having a predetermined resistance change characteristic as a function of temperature to compensate for temperature variations of the reference junction 104 from the calibration temperature. Sensistor 106 is connected in a voltage dividing compensation network 110 so as to compensate the input signal by a voltage which varies with temperature approximately the same as the voltage variance across junction 102 as a function of temperature difference from the reference junction temperature. In this manner, a corrected emf is produced which includes $^ET_0 \quad T_1$ to automatically compensate for the signal change due to the actual reference junction temperature being different from the reference junction temperature at which the thermocouple 24 is calibrated. As an example, if the reference junctions 104 were at the boiling point of water and the measuring junction 102 was at a higher temperature, the compensation voltage to be added to a thermocouple previously calibrated with the reference junction at 32° F. and to be produced by sensistor 106 would be the voltage produced by the thermocouple when the reference junctions 104 are at 32° F. and the measuring junction 102 is at the boiling point of water.

If water is used as the liquid in tube 34 about the transmitter 14, the temperature of the reference junctions 104a and 104b at terminals 44 and 48, respectively, will often be at substantially the boiling point of the water after sustained travel of unit 14 through the high temperature oven 10 whereupon the steam fills cavity 62 adjacent the terminals 44 and 48, and which steam escapes through tube 54.

The uncompensated thermocouple signal from measuring junction 102 is conducted between junctions 104a and 104b at the input terminal 44 and ground terminal 48, respectively, to the compensation network 110. The network 110 connected to terminal 44 includes the sensistor 106 connected to the positive electrode of a battery 112, and a resistor 114 connected to the negative electrode of battery 112. A resistor 116 is connected between sensistor 106 and battery 112 to a potentiometer 118 serially connected to a resistor 120 leading also to the negative electrode of battery 112. A switch 122 is further connected to the negative electrode of battery 112 and is open at position A as shown or may be closed in position B with the wiper arm of a potentiometer 124, the opposite end of which potentiometer is connected between the resistors 116 and 118 and to a resistor 119.

The sensistor 106 and resistor 116 have a substantially low resistance in comparison to the other resistors of the compensation network and may be considered as the only path of network 110 conductive of the signal from thermocouple 24. It is readily apparent that the direct current voltage drop across sensistor 106 at a given temperature and across resistor 116 may be initially set by the adjustment of the resistance values of potentiometer 118 and/or potentiometer 124 when switch 122 is in position B. Potentiometer 124 may be adjusted according to the different ranges of operation of thermocouple 24. The voltage drop across sensistor 106 thereafter is a function of temperature corresponding to the compensation voltage.

The voltage-dividing network 110 may be utilized also to compensate for the approximated change in the thermocouple signal as processed due to minor changes or circuit parameters incurred with increased temperature of the transmitter 14. More specifically, the resistance of potentiometer 118 may be varied to change the current from battery 112 through one leg having resistors 116, 118, and 120, with respect to the other leg in parallel with the one leg, and including sensistor 106 and resistor 114. Further, when switch 122 is in position B, the potentiometer 124 is in parallel with potentiometer 118 and resistor 120. The relative resistance of the current paths from battery 112 may thus be adjusted so as to further regulate the current through and, therefore, the initial voltage drop across resistor 116 with respect to the current through and the voltage drop across sensistor 106.

The thermocouple signal, as particularly compensated in accordance with the reference junction temperature during use from the reference junction calibration temperature, is conducted through resistor 119 to an inverting input of a direct current operational amplifier 120 of conventional type, such as the "$\eta a$ 702 Monolithic Operational Amplifier" particularly suitable for amplification of transducer outputs, and sold by Fairchild Semiconductor (a Division of Fairchild Camera), 313 Fairchild Drive, Mountain View, California.

The output of amplifier 120, conducted through a Zener diode 122 which establishes a reference voltage level, controls the current through a PNP-type resistor 124. A unijunction transistor 126 produces an oscillating signal at a frequency determined by the charging current to a capacitor 128. The output of unijunction transistor 126 is an audio signal of frequency proportional to the voltage at the collector of transistor 124. The current in resistor 158 is accurately proportional to the frequency and is fed back to the noninverting input of amplifier 120 to form a highly stable voltage-to-frequency converter. A second unijunction transistor 130 is provided in order to compensate for direct current drifts of the unijunction transistor 126.

The audiofrequency signal, in the form of a pulse of short duration, is coupled through a direct current blocking capacitor 132 to a pulse shaper which may be of monostable multivibrator type which includes NPN-transistor 134 and PNP-transistor 136. The output from the pulse shaper is a series of "stretched" pulses in phase and frequency with the audio signal from unijunction transistor 126. An oscillator, which includes transistor 137, produces a radiofrequency carrier signal which is amplitude modulated by the pulses at the audio signal frequency. The feedback path of the oscillator includes an inductor of a parallel tank circuit 138 which is tapped and connected to the base of transistor 137 and is also magnetically coupled to an inductor 140 connected between the base of transistor 137 and ground. Upon conduction of transistor 137, the current induced in inductor 140 in one direction drives the base more negative and below cutoff rendering the transistor 137 nonconductive. The breakdown of the field about the inductor in tank 138 induces a current in the opposite direction in inductor 140 thereby immediately rendering the base of transistor 137 positive beyond cutoff. The cycle repeats and transistor 137 sustains oscillation, and as modulated by the audio signal from transistor 136 the carrier signal is radiated from the antenna 64 magnetically coupled to the inductor of the tank circuit 138.

With good conduction in a lehr oven which typically may measure about 7 feet wide, the oven will act as a waveguide and cut off spurious signals with a half wavelength longer than the width of the oven. The cutoff signals would be at a frequency of approximately 70 ml./s. and less in the typical lehr oven mentioned. However, operation with carrier signals having a greater half wavelength than the width of the oven may often be desirable. It has been found suitable in this instance to feed a pickup wire (not shown) through the oven 10 and to anchor this wire to the sides of the oven.

The power or supply voltage source for the transmitting unit 14 is supplied from batteries 146 and 148 which are also mounted on the circuit board block 37 contained within the cylindrical casing 35 and are of a type such as those known as "mercury batteries" which have been found suitable for operation at temperatures in the area of boiling point of water. Further, silicon-type semiconductors were utilized in the transmitter for operation at such temperatures.

For purposes of example, the following lists the identifying types and/or parameters of elements, in addition to those already mentioned, utilized in a particular tested embodiment of the transmitter 14:

| Resistors | Parameter | Capacitors | Parameter |
|---|---|---|---|
| | (ohms) | | (farads) |
| 106 (sensitor) | 100 | 128 | $10^{-8}$ |
| 114 | 20.5 K | 132 | $5(10^{-10})$ |
| 116 | 100 | 163 | $10^{-7}$ |
| 118 (potent.) | 5 K | 164 | $10^{-7}$ |
| 119 | 576 | 165 | $10^{-7}$ |
| 120 | 20 K | 166 | $10^{-7}$ |
| 124 (potent.) | 17.2 K | 167 | $10^{-8}$ |
| 150 | 649 | 168 | $10^{-8}$ |
| 151 | 120 | 169 | $10^{-7}$ |
| 152 | 2.57 K | 170 | $5(10^{-10})$ |
| 153 | 1.3 K | 171 | $10^{-10}$ |
| 154 | 4.25 K | | |
| 155 | 4.75 K | Diodes | Type |
| 156 | 100 | | |
| 157 | 649 | 122 | 1N755 |
| 158 | 100 | 175 | FA8004 |
| 159 | 240 | 178 | 1N3605 |
| 160 | 7.5 K | | |
| 161 | 15.8 K | Transistors | |
| 162 | 61.9 | | |
| | | 124 | 2N3638 |
| | | 126 | 2N2647 |
| | | 130 | 2N2647 |
| | | 134 | 2N3565 |
| | | 136 | 2N3638 |
| | | 137 | 2N3641 |

Although only one embodiment of the invention has been illustrated and described, it is anticipated that various changes and modifications will be apparent to those skilled in the art, and that such may be made without departing from the scope of the invention as defined by the following claims.

I claim:

1. A system for monitoring a condition within an oven, the condition existing within the oven at a location remote from the monitoring location, the system comprising:
  a transducer for producing a signal indicative of the condition sensed within an oven;
  means for transmitting an electromagnetic energy signal corresponding to the transducer signal;
  an insulated container for receiving said transmitting means, said insulated container including liquid means and vapor escape means for preventing the temperature within said container from rising beyond a predetermined temperature while in an oven;
  means for receiving the transmitted signal; and
  means for converting the received signals to indicate the condition sensed within the oven by said transducer.

2. The system as defined in claim 1 wherein:
  said container has a cavity larger than said transmitting means and into which said cavity said transmitting means is received;
  wherein said liquid means for preventing the temperature within said cavity from rising beyond a predetermined temperature is contained in the cavity about said transmitting means, and wherein said vapor escape means includes a passageway in said container and opening externally of said container from said cavity so that the liquid upon vaporization being able to escape through the passageway so as to maintain the immediate environment of said transmitting means at substantially the liquid temperature.

3. The system as defined in claim 1 wherein the transducer includes:
  a calibrated thermocouple having a measuring junction and at least one reference junction; and
  wherein the transmitting means includes:
  an oscillator for producing a carrier signal;
  compensating means including a sensitor for providing a signal to offset any error in the signal from the thermocouple due to temperature difference of the reference junction from a predetermined calibration temperature;
  converting means for producing a pulse signal train having a frequency indicative of the amplitude of the compensated thermocouple signal;
  an antenna coupled to said oscillator; and
  means for insulating said converting means, said compensating means, said oscillator, and the reference junction of said thermocouple;
  whereby the carrier signal may be modulated by the pulse signal train from said converting means and radiated by said antenna from within the oven to said receiving means.

4. A system for measuring a condition in an oven, the system comprising: a transducer for producing a signal indicative of the condition; an electronic unit for receiving the signal from said transducer; and an insulating container for the electronic unit including,
  a base member,
  thermal insulating means within said base member and defining a cavity which receives said electronic unit, said thermal-insulating means defining said cavity receiving liquid to surround said electronic unit received in said cavity, said container having vapor escape means so as to maintain the immediate electronic unit environment substantially at the liquid temperature; and
  a cover member removably mated with said base member,
  other thermal-insulating means within said cover member,
  one of said thermal-insulating means defining a passageway extending from the cavity through the wall of the respective member,
  whereby the transducer may be connected to the electronic unit through the passageway.

5. A system for monitoring the temperature of an article of manufacture traveling through a furnace, the system comprising:
  a transducer within the furnace to travel with the article for producing a signal corresponding to the temperature of the article at successive locations in the furnace;
  a transmitter for transmitting an electromagnetic energy signal corresponding to the transducer signal;
  a portable insulated container to travel with the article, said container receiving and protecting said transmitter from adverse temperature conditions existing within the furnace;
  said insulated container containing liquid about the transmitter and having a passageway extending from within and through said container,
  whereby the liquid upon vaporization may escape from said container through the passageway so as to maintain the transmitter temperature at substantially the liquid temperature;
  means for receiving the transmitted signals;
  whereby the received signals are indicative of the temperature sensed by the transducer at successive locations within the furnace.

6. A system for monitoring an environmental condition at successive locations within an oven, the successive locations being remote from the monitoring location, the system comprising:
  a transducer for producing a signal corresponding to the condition;

a transmitter for transmitting an electromagnetic energy signal corresponding to the transducer signal;

a portable insulated container receiving the transmitter, said container having a passageway extending from within and through said container, and said container containing liquid about said transmitter;

whereby the transmitter temperature may be maintained at substantially the liquid temperature to permit efficient transmitter operation within the furnace;

means for moving said transducer, transmitter and container through the oven; and means for receiving the transmitted signals;

whereby the transmitted signal may be received outside the oven from the remote locations of the sensed environmental condition.

7. A method of protecting a transmitter traveling through an oven, the steps comprising:

sealing the transmitter in a liquidproof container;

immersing the sealed transmitter in a contained liquid medium;

enclosing the sealed transmitter in the contained liquid medium within an insulating container; and conducting the contained liquid in vapor form out of the insulating container.

8. A method of maintaining a reference junction of a thermocouple transducer traveling through a heat treating oven below a predetermined temperature within the oven, the steps comprising:

positioning the reference junction of the thermocouple in a liquid environment;

insulating the reference junction of the thermocouple and the liquid environment; and conducting the contained liquid in vapor form out of the insulating container;

whereby the reference junction may be substantially maintained below the predetermined temperature corresponding to the boiling point temperature of the liquid contained.

9. An assembly for sensing a condition within an oven comprising: an insulated container defining therein a cavity of predetermined size; sensing means for producing a signal indicative of the condition sensed within the oven, at least a portion of said sensing means being positioned within said cavity, said portion being smaller in size than said cavity; and a liquid contained within said cavity and vapor escape means for preventing the temperature within said cavity from rising beyond a predetermined temperature.

* * * * *